US009936453B1

(12) United States Patent
Iyer et al.

(10) Patent No.: US 9,936,453 B1
(45) Date of Patent: Apr. 3, 2018

(54) DYNAMIC TIMING UPDATE TECHNIQUES FOR WIRELESS DEVICES

(71) Applicant: QUALCOMM Incorporated, San Diego, CA (US)

(72) Inventors: Ashish Shankar Iyer, San Diego, CA (US); Naveen Kumar Pasunooru, Hyderabad (IN); Prashanth Mohan, Chennai (IN); Raevanth Venkat Annam, Tuticorin (IN); Srihari Vodnala, Adilabad (IN); Dhananjaya Sarma Ponukumati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/657,829

(22) Filed: Jul. 24, 2017

(51) Int. Cl.
H04W 52/02 (2009.01)
H04W 76/04 (2009.01)
H04W 88/06 (2009.01)

(52) U.S. Cl.
CPC ..... H04W 52/0216 (2013.01); H04W 76/048 (2013.01); H04W 88/06 (2013.01)

(58) Field of Classification Search
CPC .................................................. H04W 4/005
See application file for complete search history.

(56) References Cited

U.S. PATENT DOCUMENTS 8,654,691 B2   2/2014   Anderson et al.
9,504,012 B1   11/2016  Ljung et al.
2005/0111396 A1* 5/2005 Kim .................. H04W 24/00
                                                              370/318
2012/0207070 A1   8/2012   Xu et al.
2016/0270038 A1* 9/2016 Papasakellariou .. H04W 72/042
2017/0013554 A1   1/2017   Jain et al.

OTHER PUBLICATIONS

Tang L., et al., "Self-adaptive Power Saving Mechanism for M2M", 5th IET International Conference on Wireless, Mobile and Multimedia Networks (ICWMMN 2013), 2013, pp. 18-23.

* cited by examiner

Primary Examiner — Hsin-Chun Liao
(74) Attorney, Agent, or Firm — Holland & Hart LLP

(57) ABSTRACT

Methods, systems, and devices for wireless communication are described. The described techniques allow a user equipment (UE) to conserve power after transitioning from one coverage mode to another coverage mode based on power consumption estimates. The UE may make a determination on whether to modify its current extended discontinuous reception (eDRX) values by either triggering an unscheduled timing update or waiting for a scheduled timing update. For instance, the UE may estimate power consumption based on current eDRX values and the time remaining until a scheduled timing update procedure and compare this estimate to power consumption estimate based on modified eDRX values and the amount of power consumed to perform an unscheduled timing update procedure. Based on the comparison, the UE may update its eDRX values through an unscheduled TAU or through the regularly scheduled TAU procedure.

30 Claims, 9 Drawing Sheets

DYNAMIC TIMING UPDATE TECHNIQUES FOR WIRELESS DEVICES

BACKGROUND

The following relates generally to wireless communication, and more specifically to dynamic timing update techniques for wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications, such as internet of things (IoT) communications, a device (e.g., a UE, a low cost (LC) IoT device) may transition between coverage enhancement (CE) modes depending on channel conditions, power consumption, or other factors. When a device transitions from a normal coverage CE Mode (e.g., CE Mode A) to an extended coverage CE Mode (e.g., CE Mode B), the device may retain the wakeup interval values of CE Mode A until the next update procedure is performed. In some cases, a device operating according to CE Mode A wakes up more frequently than when operating according to CE Mode B, and as a result, there may be additional power drain when a device operates using CE Mode A wakeup interval values while in CE Mode B. More efficient techniques for reducing power drain are desired.

SUMMARY

The described techniques relate to improved methods, systems, devices, or apparatuses that support dynamic timing update techniques for wireless devices. Generally, the described techniques allow a UE that has transitioned from one coverage mode (e.g., CE Mode A) to another coverage mode (e.g., CE Mode B) to conserve power by enabling the UE to make a determination on whether to modify its extended discontinuous reception (eDRX) values. The UE may change its eDRX values after transitioning from mode to another by triggering an unscheduled tracking area update (TAU) procedure. Alternatively, in order to update its eDRX values, the UE may wait for a timer to expire and perform a scheduled TAU procedure. To determine whether to wait for a scheduled TAU procedure or perform an unscheduled TAU procedure, the UE may estimate power consumption based on current eDRX values and the time remaining before a scheduled TAU procedure is to be performed. The UE may compare this estimate to another estimate of power consumption determined based on modified eDRX values and the amount of power consumed when performing an unscheduled TAU procedure. Based on the comparison, the UE may update its eDRX values through an unscheduled TAU procedure shortly after transitioning from one mode to another or through the regularly scheduled TAU procedure.

A method of wireless communication is described. The method may include transitioning, by a UE, from a first coverage mode to a second coverage mode, estimating a first power consumption of the UE operating according to a first set of parameters that correspond to the first coverage mode, the first power consumption estimated based at least in part on a time remaining until a scheduled TAU procedure, estimating a second power consumption of the UE operating according to a second set of parameters that correspond to the second coverage mode, the second power consumption estimated based at least in part on the time remaining until the scheduled TAU procedure, and performing a timing update procedure based at least in part on a comparison between the estimated first power consumption and the estimated second power consumption.

An apparatus for wireless communication is described. The apparatus may include means for transitioning, by a UE, from a first coverage mode to a second coverage mode, means for estimating a first power consumption of the UE operating according to a first set of parameters that correspond to the first coverage mode, the first power consumption estimated based at least in part on a time remaining until a scheduled TAU procedure, means for estimating a second power consumption of the UE operating according to a second set of parameters that correspond to the second coverage mode, the second power consumption estimated based at least in part on the time remaining until the scheduled TAU procedure, and means for performing a timing update procedure based at least in part on a comparison between the estimated first power consumption and the estimated second power consumption.

Another apparatus for wireless communication is described. The apparatus may include a processor, memory in electronic communication with the processor, and instructions stored in the memory. The instructions may be operable to cause the processor to transition, by a UE, from a first coverage mode to a second coverage mode, estimate a first power consumption of the UE operating according to a first set of parameters that correspond to the first coverage mode, the first power consumption estimated based at least in part on a time remaining until a scheduled TAU procedure, estimate a second power consumption of the UE operating according to a second set of parameters that correspond to the second coverage mode, the second power consumption estimated based at least in part on the time remaining until the scheduled TAU procedure, and perform a timing update procedure based at least in part on a comparison between the estimated first power consumption and the estimated second power consumption.

A non-transitory computer readable medium for wireless communication is described. The non-transitory computer-readable medium may include instructions operable to cause a processor to transition, by a UE, from a first coverage mode to a second coverage mode, estimate a first power consumption of the UE operating according to a first set of parameters that correspond to the first coverage mode, the first power consumption estimated based at least in part on a time remaining until a scheduled TAU procedure, estimate a second power consumption of the UE operating according to a second set of parameters that correspond to the second coverage mode, the second power consumption estimated based at least in part on the time remaining until the scheduled TAU procedure, and perform a timing update procedure based at least in part on a comparison between the estimated first power consumption and the estimated second power consumption.

Some examples of the method, apparatus, and non-transitory computer-readable medium described above may further include processes, features, means, or instructions for determining that the estimated first power consumption may be greater than the estimated second power consumption. Some examples of the method, apparatus, and non-transitory computer-readable medium described above may further include processes, features, means, or instructions for initiating an unscheduled TAU procedure prior to the scheduled TAU procedure based at least in part on the determination.

In some examples of the method, apparatus, and non-transitory computer-readable medium described above, the unscheduled TAU procedure may be initiated after the determination.

Some examples of the method, apparatus, and non-transitory computer-readable medium described above may further include processes, features, means, or instructions for determining that the estimated second power consumption may be greater than the estimated first power consumption. Some examples of the method, apparatus, and non-transitory computer-readable medium described above may further include processes, features, means, or instructions for refraining from performing an unscheduled TAU procedure based at least in part on the determination.

In some examples of the method, apparatus, and non-transitory computer-readable medium described above, performing the timing update procedure comprises: modifying an extended eDRX cycle duration of the UE.

In some examples of the method, apparatus, and non-transitory computer-readable medium described above, the first set of parameters comprises a first extended eDRX cycle duration corresponding to the first coverage mode and an eDRX wakeup power.

In some examples of the method, apparatus, and non-transitory computer-readable medium described above, the second set of parameters comprises a second eDRX cycle duration corresponding to the second coverage mode, the eDRX wakeup power, and a TAU wakeup power.

In some examples of the method, apparatus, and non-transitory computer-readable medium described above, the first eDRX cycle duration may be different from the second eDRX cycle duration.

Some examples of the method, apparatus, and non-transitory computer-readable medium described above may further include processes, features, means, or instructions for calculating the time remaining until the scheduled TAU based at least in part on a time of transition from the first coverage mode to the second coverage mode.

Some examples of the method, apparatus, and non-transitory computer-readable medium described above may further include processes, features, means, or instructions for initiating a hysteresis timer after transitioning from the first coverage mode to the second coverage mode, wherein performing the timing update procedure may be based at least in part on the hysteresis timer.

Some examples of the method, apparatus, and non-transitory computer-readable medium described above may further include processes, features, means, or instructions for transitioning from the second coverage mode to the first coverage mode within a time interval following transition from the first coverage mode to the second coverage mode. Some examples of the method, apparatus, and non-transitory computer-readable medium described above may further include processes, features, means, or instructions for performing the scheduled TAU procedure based at least in part on a comparison between the time interval and a time of the hysteresis timer at the transition from the second coverage mode to the first coverage mode.

In some examples of the method, apparatus, and non-transitory computer-readable medium described above, the scheduled TAU procedure may be a periodic TAU procedure.

In some examples of the method, apparatus, and non-transitory computer-readable medium described above, the first coverage mode may be CE mode A and the second coverage mode may be CE mode B.

DETAILED DESCRIPTION

Figure 1:
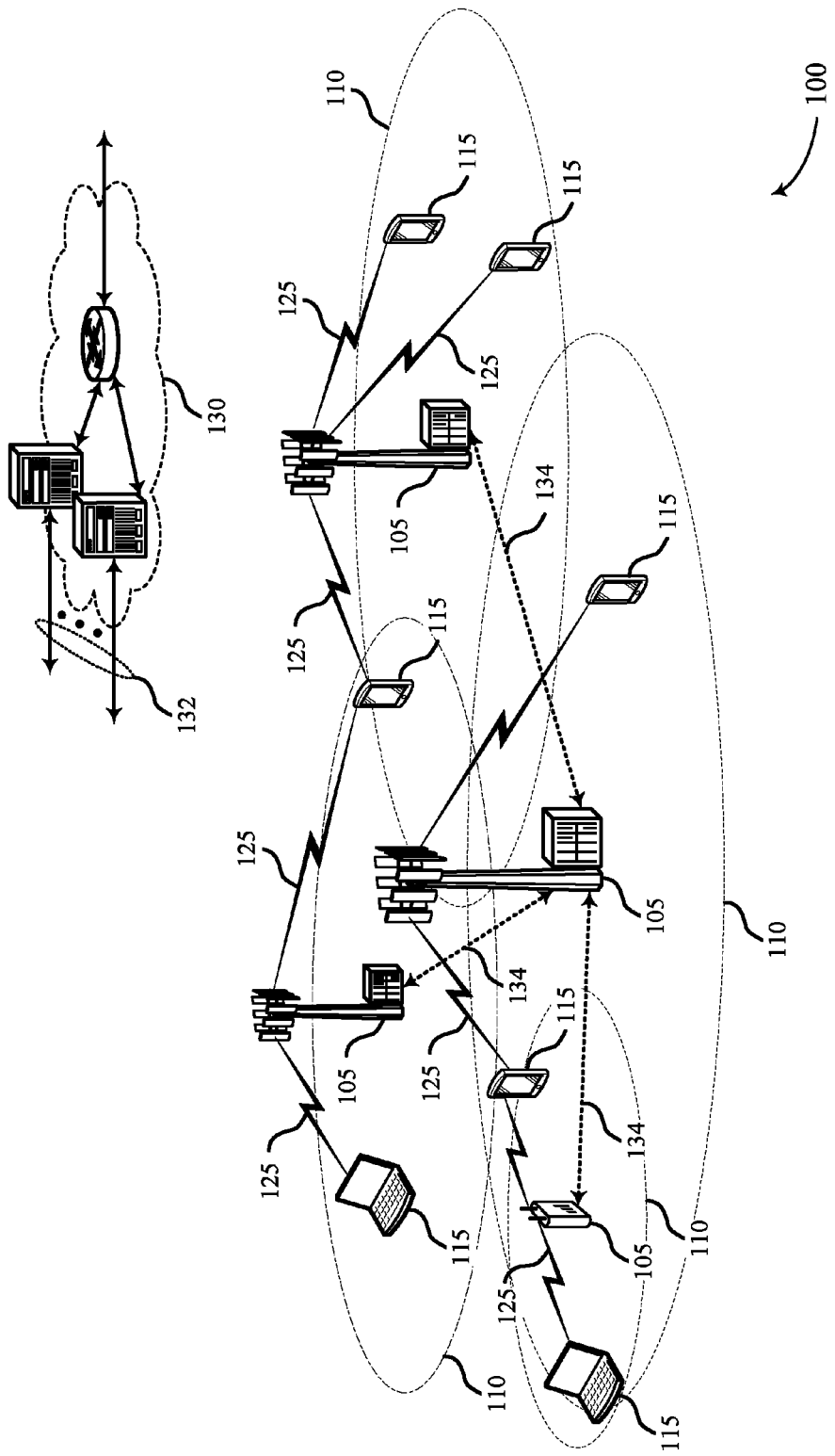
FIG. 1 illustrates an example of a wireless communications system that supports dynamic timing update techniques for wireless devices in accordance with aspects of the present disclosure.

In some wireless communications, such as IoT communications, a device (e.g., a UE, a LC IoT device) may transition between CE Modes depending on channel conditions (e.g., signal to noise ratio (SNR), interference, reference signal received power (RSRP)), power consumption, or other factors. LC IoT devices, such as Category M (CAT-M) devices, may be power conservative devices that have speed or throughput limits and such devices may be categorized based on their coverage capabilities. For instance, CE Mode A devices may be associated with normal coverage (NC) capabilities that allow an SNR of up to −6 dB. CE Mode B devices may be associated with enhanced coverage (EC) capabilities that allow an SNR range of between −6 dB and −15 dB and may be used by a device far from a base station, at a cell edge, or in a low coverage area (e.g., underground), for example.

LC devices may be implemented in IoT networks and may be referred to as CAT-M devices rather than traditional Category 1 (CAT-1) devices. In some cases, a CAT-M device may have a reduced peak data rate relative to CAT-1 devices, may use a single receive antenna, may operate using half duplex frequency division duplexing (FDD), and may perform transmissions using a reduced bandwidth compared to CAT-1 devices (e.g., 1.4 MHz rather than 20 MHz). Additionally, CAT-M devices may classify UEs in a power class of 20 dBM, along with 23 dBM power class devices.

CAT-M devices may also support deployment in locations with relatively poor channel conditions. Different CE Modes may be used to enhance communication for such devices and may be selected based on the device type, channel conditions, coverage area, etc. CAT-M devices may optionally support one or more CE Modes.

One way to conserve power at an LC IoT device is to use eDRX to monitor for pages from the network (e.g., a base station) within a paging window. The paging window design of eDRX may include using multiple short paging intervals, which may be adjustable, to enable reception of paging information during the paging window. Using eDRX, the idle time of a device may be extended to conserve power.

The eDRX cycle (e.g., the time between wakeup periods for a given UE) may be set by the network. In some cases, a device operating in CE Mode A may have an eDRX cycle that is shorter than a device operating in CE Mode B and may therefore wake more frequently than a device operating in CE Mode B. When a device transitions from a first CE Mode (e.g., CE Mode A) to a second CE Mode (e.g., CE Mode B), the device may retain the eDRX values of CE Mode A until an update timer (e.g., timer T3412) expires. As a device operating according to CE Mode A wakes up more frequently than when operating according to CE Mode B, there may be additional power drain when a device operates using CE Mode A eDRX values while in CE Mode B.

To change the eDRX values, a device may perform a TAU procedure, which is scheduled to occur when an update timer expires. A device may start or reset the timer when entering an idle mode following the TAU procedure. However, when a device transitions from CE Mode A to CE Mode B, there may still be time remaining before the update timer expires and during this time, the device may operate using the eDRX values of CE Mode A rather than eDRX values of CE Mode B. This may result in the device waking more often than when using eDRX values of CE Mode B, which may cause increased power consumption at the device. In some cases, the device may be capable of triggering a TAU procedure to update the timing values, but when a device is operating in CE Mode B, the signal to interference plus noise ratio (SINR) may be low and triggering a TAU procedure may consume additional power resources. A device may determine when to trigger, negotiate with the network, and update the eDRX cycle duration value.

Aspects of the disclosure are initially described in the context of a wireless communications system. Aspects are then described with respect to device timelines. Aspects of the disclosure are further illustrated by and described with reference to apparatus diagrams, system diagrams, and flowcharts that relate to dynamic timing update techniques for wireless devices.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a MTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-*a* may include subcomponents such as an access network entity 105-*b*, which may be an example of an access node controller (ANC). Each access network entity 105-*b* may communicate with a number of UEs 115 through a number of other access network transmission entities 105-*c*, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize $ext_{rem}ely$ high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Some UEs 115, such as MTC or IoT devices, may be LC or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

In some cases, to conserve power, a UE 115 may negotiate eDRX values (e.g., eDRX cycle duration) with the network (e.g., a base station 105 or entity of core network 130) when the UE 115 transitions from higher power CE Mode (e.g., CE Mode A) to lower power CE Mode (e.g., CE Mode B). In some examples, the UE 115 may use RSRP (e.g., if the RSRP signal strength crosses a threshold) to deduce that it has transitioned from one mode to another. When a UE 115 transitions from CE Mode A to CE Mode B, the UE 115 may initiate a process to determine whether to update the eDRX value. For instance, once in CE Mode B, the UE 115 may determine update (e.g., increase or decrease) its eDRX value. If the UE 115 increases the eDRX value, the UE 115 may wake up less frequently, resulting in a longer idle time and reduced power consumption. In some cases, the UE 115 may modify its eDRX value to a larger value (e.g., 2621.44 seconds) prior to negotiation (e.g., to prevent the UE 115 from waking up when making a determination whether to update the eDRX value). According to some aspects, the UE 115 may update its eDRX value at an unscheduled time.

One option for negotiation with the network may occur shortly after the UE 115 enters CE Mode B (e.g., transitions from CE Mode A to CE Mode B). In this case, the UE 115 may determine to immediately trigger a TAU procedure in order to update its eDRX value. Another option for negotiation with the network may occur at the next periodic TAU procedure as determined by the expiration of the TAU timer (e.g., timer T3412). To determine which option to use, the UE 115 may calculate the energy consumption at the UE 115 for each option. These calculations may include determining the remaining TAU duration at the time of the transition and the amount of power consumption if the UE 115 uses CE Mode A eDRX values for the remaining TAU duration. These calculations may also involve determining the amount of power consumption if the UE 115 triggers a TAU procedure, which uses power, and then uses CE Mode B eDRX values for the remaining TAU duration. Based on the calculations, the UE 115 may then decide whether to immediately trigger a TAU procedure or wait for the next periodic TAU procedure. For example, if the power to trigger a TAU along with the power consumed by the UE 115 in the CE Mode B for the remaining TAU duration is less than the power consumed by the UE 115 operating in CE Mode A for the remaining TAU duration, the UE 115 may determine to trigger a TAU immediately (e.g., trigger an unscheduled TAU). This method allows for increased power management and conservation when a UE 115 transitions from CE Mode A to CE Mode B.

If a UE 115 transitions between modes (e.g., transitions back from CE Mode B to CE Mode A) within a hysteresis time (e.g., as determined by a hysteresis timer), the UE 115 may wait to update eDRX values until the next periodic TAU procedure. This may prevent a ping-pong effect of eDRX value updates if a UE 115 changes modes multiple times in a relatively short time frame.

Figure 2:
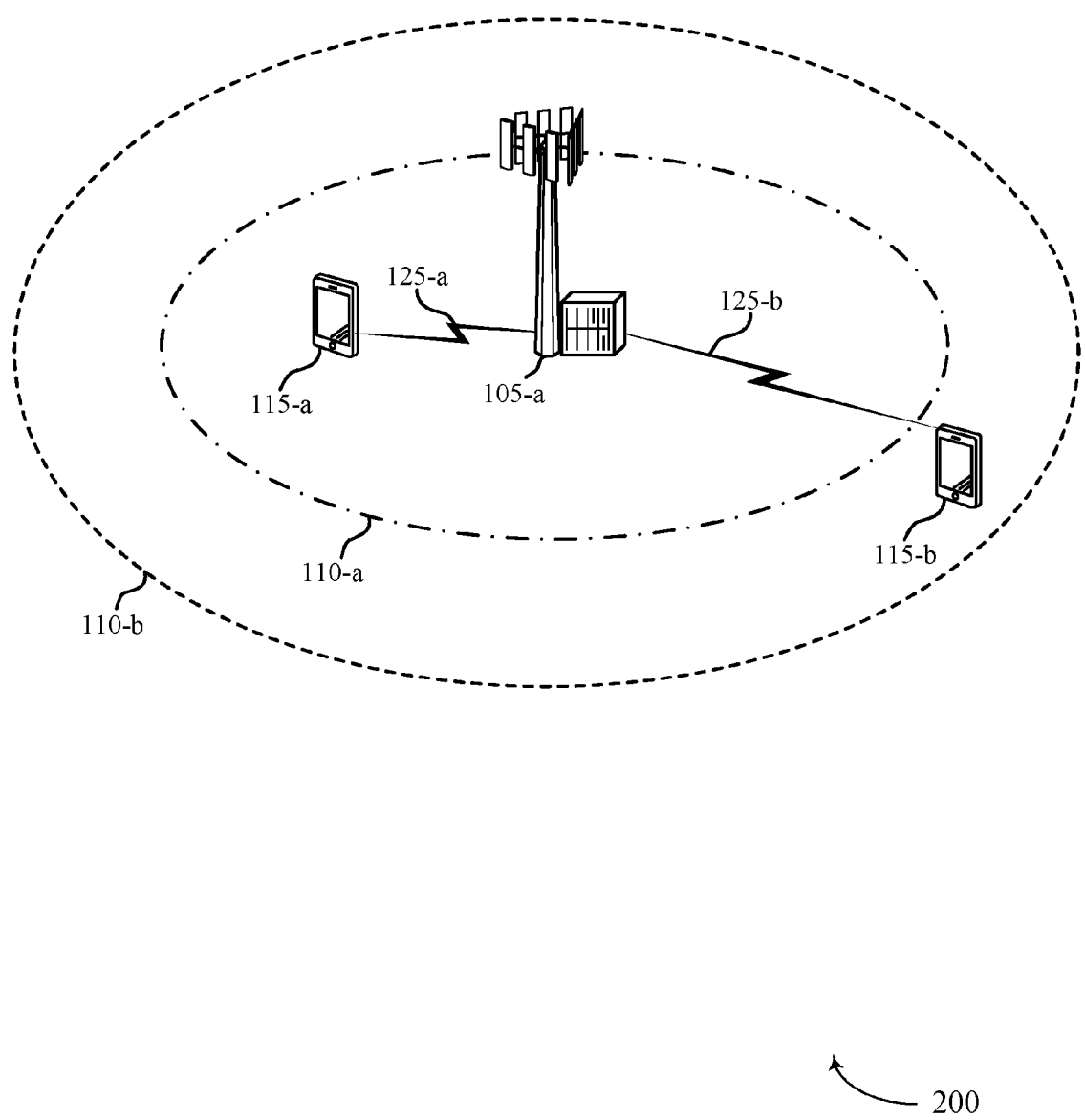
FIG. 2 illustrates an example of a wireless communications system that supports dynamic timing update techniques for wireless devices in accordance with aspects of the present disclosure.

FIG. 2 illustrates an example of a wireless system 200 that supports dynamic timing update techniques for wireless devices in accordance with various aspects of the present disclosure. In some examples, wireless system 200 may implement aspects of wireless communication system 100. The wireless system may include a base station 105-a, UEs 115-a and 115-b, a normal coverage area 110-a, and an extended coverage area 110-b. UE 115-a may communicate with base station 105-a using communication link 125-a and UE 115-b may communicate with base station 105-a using communication link 125-b.

As shown, UE 115-a is located in normal coverage area 110-a. UE 115-a may be a CAT-M device operating in CE Mode A (e.g., due to its distance from the base station 105-a or the signal quality of communication link 125-a). UE 115-a may operate according to an eDRX cycle in CE Mode A. If UE 115-a were to move outside of normal coverage area 110-a or experience a reduction in signal quality, UE 115-a may transition from CE Mode A to CE Mode B.

UE 115-b is located in extended coverage area 110-b. UE 115-b may be a CAT-M device operating in CE Mode B (e.g., due to its distance from the base station 105-a or the signal quality of communication link 125-b). UE 115-b may operate according to an extended eDRX cycle in CE Mode B. If UE 115-b were to move into the normal coverage area 110-a or experience an improvement in signal quality, UE 115-b may transition from CE Mode B to CE Mode A.

Figure 3A:
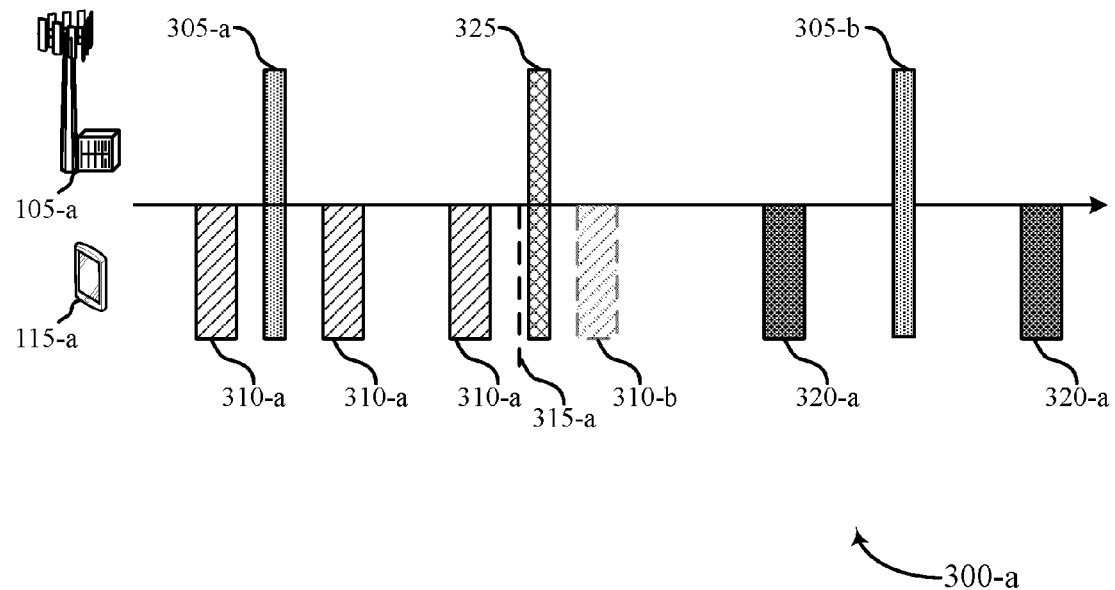
FIGS. 3A and 3B illustrate examples of a timeline that supports dynamic timing update techniques for wireless devices in accordance with aspects of the present disclosure.
Figure 4:
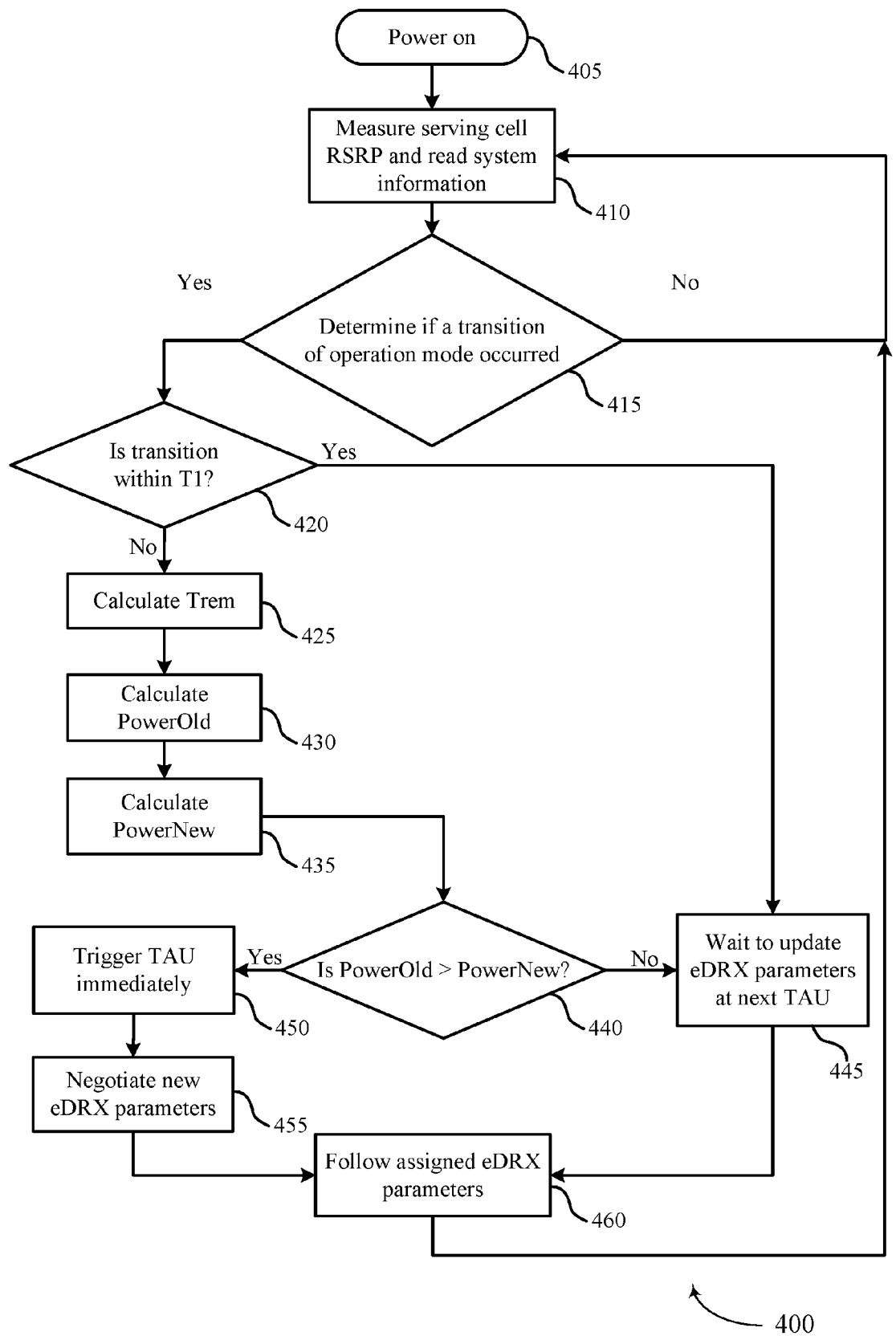
FIG. 4 illustrates an example flowchart of a process that supports dynamic timing update techniques for wireless devices in accordance with aspects of the present disclosure.

FIGS. 3A and 4B illustrate example timelines 300 that support dynamic timing update techniques for wireless devices in accordance with various aspects of the present disclosure. Timelines 300 may implement aspects of wireless communications system 100 or 200 as described with reference to FIGS. 1 and 2. Example timelines 300-a and 300-b include timing of operations at devices of a wireless communications system (e.g., base station 105 and UE 115).

As shown, timelines 300-a and 300-b illustrate examples of a UE 115-a operating in a first coverage mode (e.g., CE Mode A), transitioning to a second coverage mode (e.g., CE Mode B), and operating according to the second coverage mode. In timeline 300-a, TAU procedures 305 are scheduled based on an update timer (e.g., timer T3412) such that upon expiration of the update timer, a scheduled TAU procedure 305 is performed. UE 115-a is operating in CE Mode A having an eDRX cycle illustrated by wake periods 310-a. Scheduled TAU procedure 305-a is performed and the update timer is reset. At 315-a, UE 115 transitions from operating in CE Mode A to CE Mode B. After transitioning at 315-a, UE 115 determines to perform an unscheduled TAU procedure 325 in order to conserve power. By performing the unscheduled TAU procedure 325, the UE 115-a may negotiate (e.g., with base station 105-a) and update its eDRX values (e.g., from CE Mode A eDRX values to CE Mode B eDRX values) and wakeup according to wake periods 320-a.

The determination to perform unscheduled TAU procedure 325 may be based on an estimate of the power consumed until the next scheduled TAU procedure 305-*b* (e.g., based on the time remaining on the update timer) using wake periods 310-*a* and an estimate of power consumed until the next scheduled TAU procedure 305-*b* (e.g., based on the time remaining on the update timer) using wake periods 320-*a*. For example, if the estimate of power consumed when operating using eDRX values of CE Mode A is greater than the estimate of power consumed when operating using eDRX values of CE Mode B along with the power costs for triggering a TAU procedure, UE 115-*a* may trigger the unscheduled TAU procedure 325. If the unscheduled TAU procedure 325 is not triggered (e.g., if the estimate of power consumed when operating using eDRX values of CE Mode A is less than the estimate of power consumed when operating using eDRX values of CE Mode B along with the power consumed for triggering a TAU procedure), the UE 115-*a* would continue to operate using eDRX values of CE Mode A (e.g., by waking up during wake period 310-*b* (and others) until the next scheduled TAU procedure 305-*b*).

In timeline 300-*b*, TAU procedures 305-*c* and 305-*d* are scheduled based on an update timer (e.g., timer T3412) such that upon expiration of the update timer, a scheduled TAU procedure 305 is performed. UE 115-*b* is operating in CE Mode A having an eDRX cycle illustrated by wake periods 310-*c*. Scheduled TAU procedure 305-*c* is performed and the update timer is reset. At 315-*b*, UE 115-*b* transitions from operating in first coverage mode (e.g., CE Mode A) to a second coverage mode (e.g., CE Mode B). As shown, after transitioning, UE 115-*b* determines to not perform an unscheduled TAU procedure and instead the UE 115-*a* waits until the next scheduled TAU procedure 305-*d*.

The determination not to perform an unscheduled TAU procedure may be based on an estimate of the power consumed until the next scheduled TAU procedure 305-*d* (e.g., based on the time remaining on the update timer) using wake periods 310-*c* and an estimate of power consumed until the next scheduled TAU procedure 305-*d* (e.g., based on the time remaining on the update timer) using wake periods 320-*b*. For example, if the estimate of power consumed when operating using eDRX values of CE Mode A is less than the estimate of power consumed when operating using eDRX values of CE Mode B along with the power consumed for triggering a TAU procedure, the UE 115-*b* continues to operate using eDRX values of CE Mode A (e.g., by waking up during wake periods 310-*c* until the next scheduled TAU procedure 305-*d*). At the next scheduled TAU procedure 305-*d*, UE 115 may negotiate and update its stored eDRX cycle values with the network to operate in according to an eDRX cycle having wake periods 320-*b*.

Figure 3B:
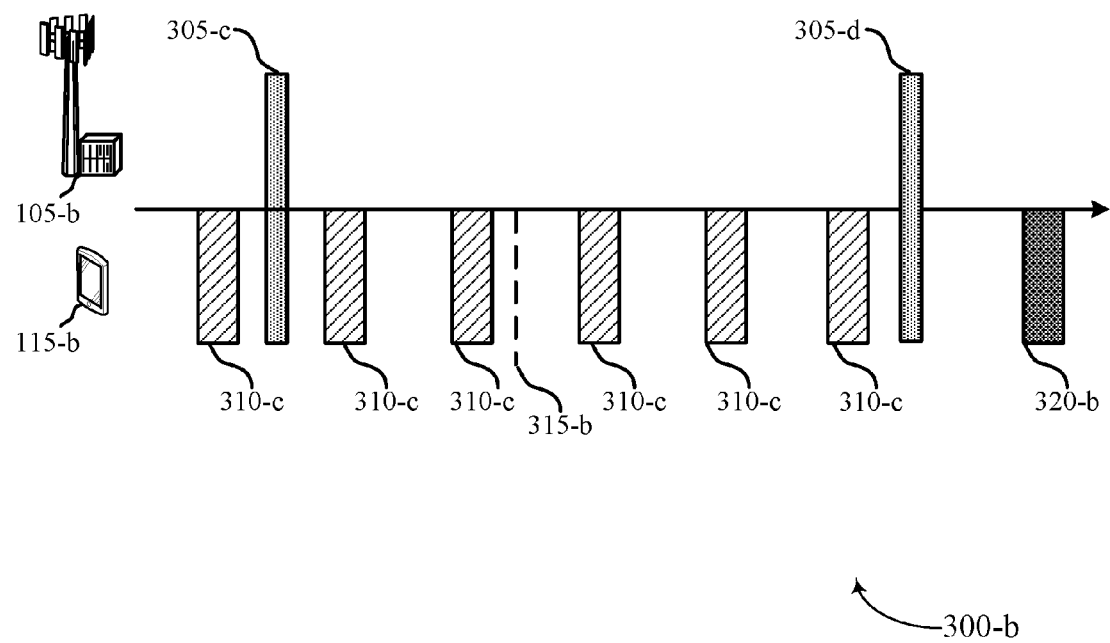
Figure 5:
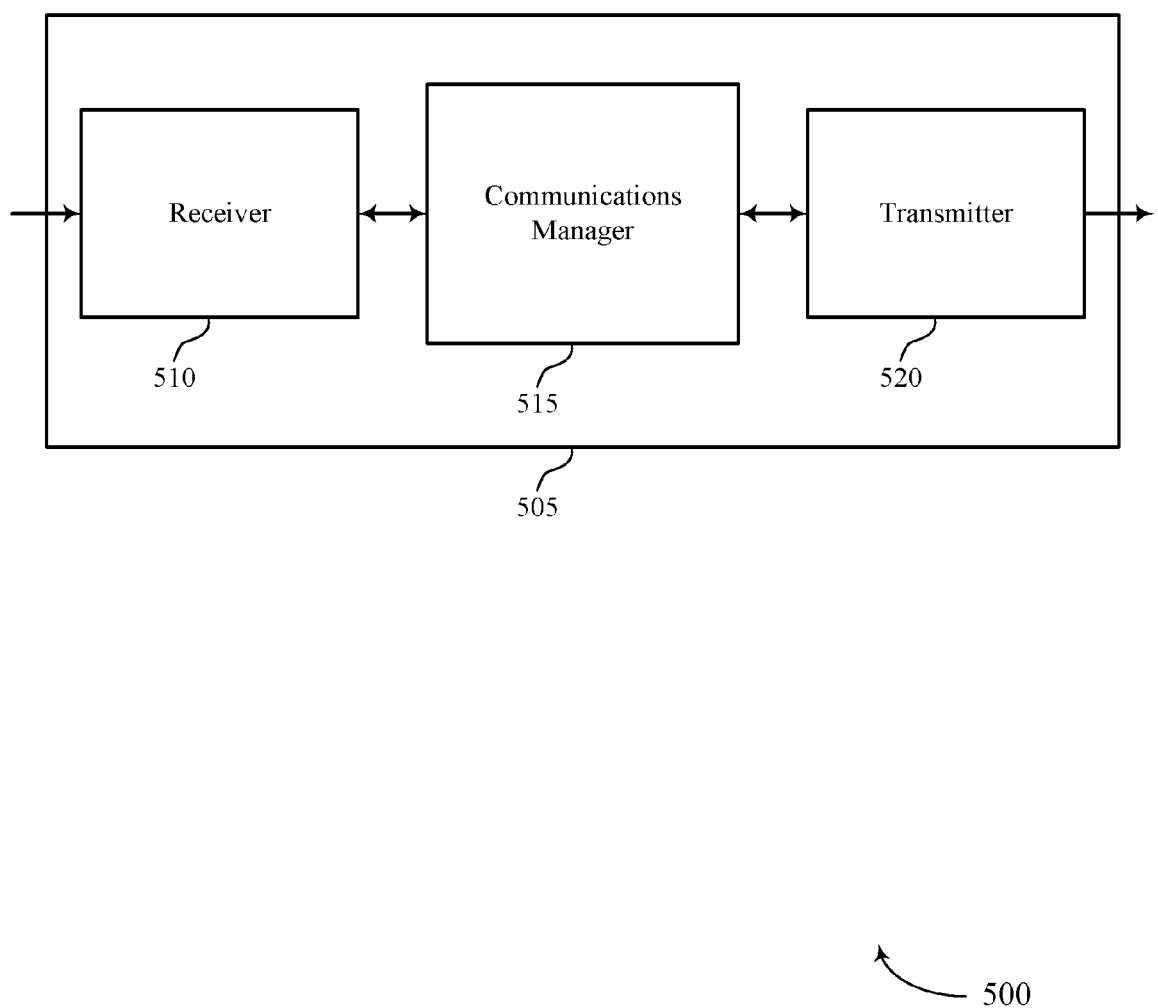
FIGS. 5 through 7 show diagrams of a device that supports dynamic timing update techniques for wireless devices in accordance with aspects of the present disclosure.

FIG. 5 illustrates an example of a flowchart 500 of a process that supports dynamic timing update techniques for wireless devices in accordance with various aspects of the present disclosure. In some examples, process flowchart 500 may implement aspects of wireless communications systems 100 or 200 as described with reference to FIGS. 1 and 2. In some examples, the flowchart 400 may be performed at UE 115 and in accordance with timelines 300 as described with reference to FIGS. 3A and 3B.

At 405, a UE 115 may be powered on and proceed to 410 where the UE 115 measures the serving cell RSRP. In some cases, the UE 115 may also read system information (e.g., system information blocks (SIBs)), which may be used to determine coverage modes of operation or thresholds used to determine whether.

At 415, UE 115 may determine if a transition of operation mode occurred, such as a transition from a first coverage mode (e.g., CE Mode A) to a second coverage mode (e.g., CE Mode B). This determination may be based on the serving cell RSRP measured at 410 and the system information. For example, the UE 115 may obtain thresholds (e.g., from SIB2) and compare the RSRP with the thresholds to determine whether a transition from one mode to another has occurred. If it is determined that no transition occurred, the UE 115 returns to 410. If it is determined that a transition has occurred, the UE 115 continue to 420 and determines whether the transition occurred within a time interval, such as a hysteresis time ($T_1$), which may be based on a hysteresis timer activated upon entering a coverage mode. For instance, UE 115 may compare the time interval after entering a coverage mode with $T_1$ and if the UE 115 transitioned within $T_1$, UE 115 may proceed to 445 and waits to update eDRX cycle values until the next timing update procedure (e.g., a scheduled TAU procedure).

If the UE 115 did not transition within $T_1$, UE 115 continues to 425 and calculates the time remaining ($T_{rem}$) until the next scheduled TAU procedure. In this example, $T_{rem}$ is the time between the next scheduled TAU procedure less the time since the UE 115 performed a previous TAU procedure. $T_{rem}$ may be determined once the UE 115 transitions to a different coverage mode, such as from CE Mode A to CE Mode B. In some cases, $T_{rem}$ may be on the scale of minutes. In an example, $T_{rem}$ is 5 minutes. After $T_{rem}$ is calculated, UE 115 may proceeds to 430.

At 430, UE 115 calculates the power consumption (PowerOld) based on continuing to operate with the eDRX values of the previous coverage mode (e.g., CE Mode A eDRX values) until the next scheduled TAU procedure. PowerOld may be calculated according to equation 1:

$$\text{PowerOld} = \text{floor}(T_{rem}/\text{previous eDRX value}) * \text{PowerEDRXwake} \quad (1)$$

where floor is a function that rounds down to the nearest integer, previous eDRX value is the time interval between wake periods of the previous coverage mode, and PowerEDRXwake is the power consumed during each eDRX wake period. In an example, $T_{rem}$ is 5 minutes, old eDRX cycle duration is 1 minute, and PowerEDRXwake is 1 dB. In this case, PowerOld would come out to be 5 dB.

At block 435, UE 115 calculates the power consumption (PowerNew) based on operating according to the eDRX cycle values of the new coverage mode (e.g., CE Mode B eDRX cycle values) for $T_{rem}$ combined with the power consumption of triggering an unscheduled TAU procedure. $T_{rem}$ may be the same $T_{rem}$ as used in the PowerOld calculation. PowerNew may be calculated according to equation 2:

$$\text{PowerNew} = \text{floor}(T_{rem}/\text{new eDRX value}) * \text{PowerEDRXwake} + \text{PowerTAU} \quad (2)$$

where floor is a function that rounds down to the nearest integer, new eDRX value is the time interval between wake periods of the current coverage mode, PowerEDRXwake is the power consumed during each eDRX wake period, and PowerTAU is the power consumed at the UE 115 in order to trigger an unscheduled TAU procedure. Continuing with the above example values ($T_{rem}$ of 5 minutes and PowerEDRXwake is 1 dB) and if new eDRX cycle duration is 3 minutes and PowerTAU is 1.5 dB, PowerNew would come out to be 2.5 dB. In some cases, PowerNew may be calculated before PowerOld.

After PowerNew is calculated, UE 115 may compare the calculated power consumptions PowerOld and PowerNew at

440. If PowerOld is less than PowerNew, UE 115 advances to block 445 where UE 115 waits to update eDRX cycle values until the next scheduled TAU procedure. If PowerOld is less than PowerNew, UE 115 proceeds to 450 and triggers a timing update procedure (e.g., an unscheduled TAU procedure). During the unscheduled TAU procedure, UE 115 negotiates new eDRX parameters (e.g., eDRX values) with the base station 105, for example. Once new eDRX parameters are determined, UE 115 continues to 460 and operates according to the new eDRX parameters. After 460, UE 115 may return to 410 and monitor RSRP values to determine whether a coverage mode transition has occurred.

Figure 6:
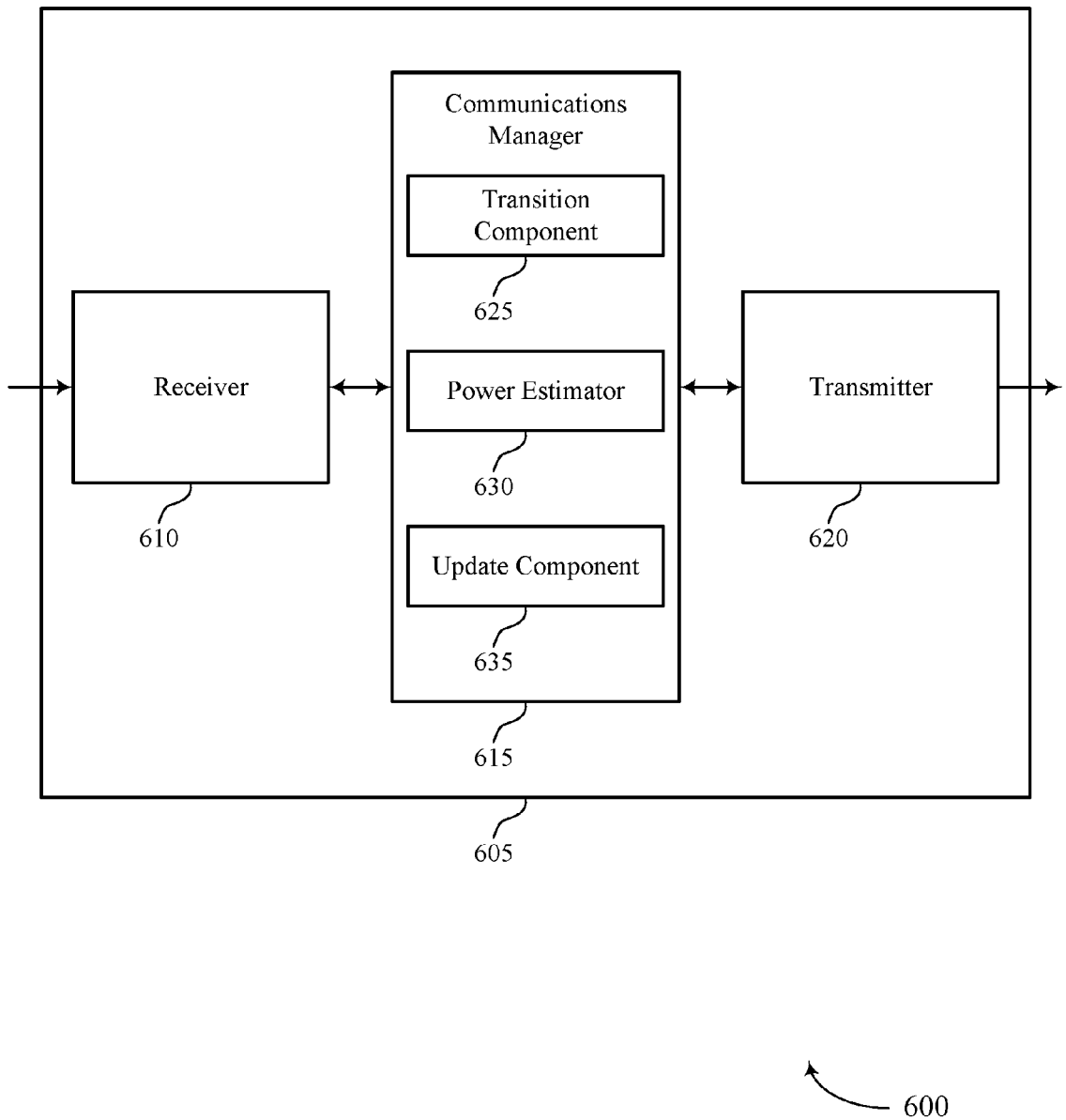

FIG. 6 shows a block diagram 600 of a wireless device 605 that supports dynamic timing update techniques for wireless devices in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic timing update techniques for wireless devices, etc.). Information may be passed on to other components of the device. The receiver 610 may be an example of aspects of the transceiver 935 described with reference to FIG. 9. The receiver 610 may utilize a single antenna or a set of antennas. Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may transition, by a UE, from a first coverage mode to a second coverage mode and estimate a first power consumption of the UE operating according to a first set of parameters that correspond to the first coverage mode, the first power consumption estimated based on a time remaining until a scheduled TAU procedure. Communications manager 615 may estimate a second power consumption of the UE operating according to a second set of parameters that correspond to the second coverage mode, the second power consumption estimated based on the time remaining until the scheduled TAU procedure, and perform a timing update procedure based on a comparison between the estimated first power consumption and the estimated second power consumption.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
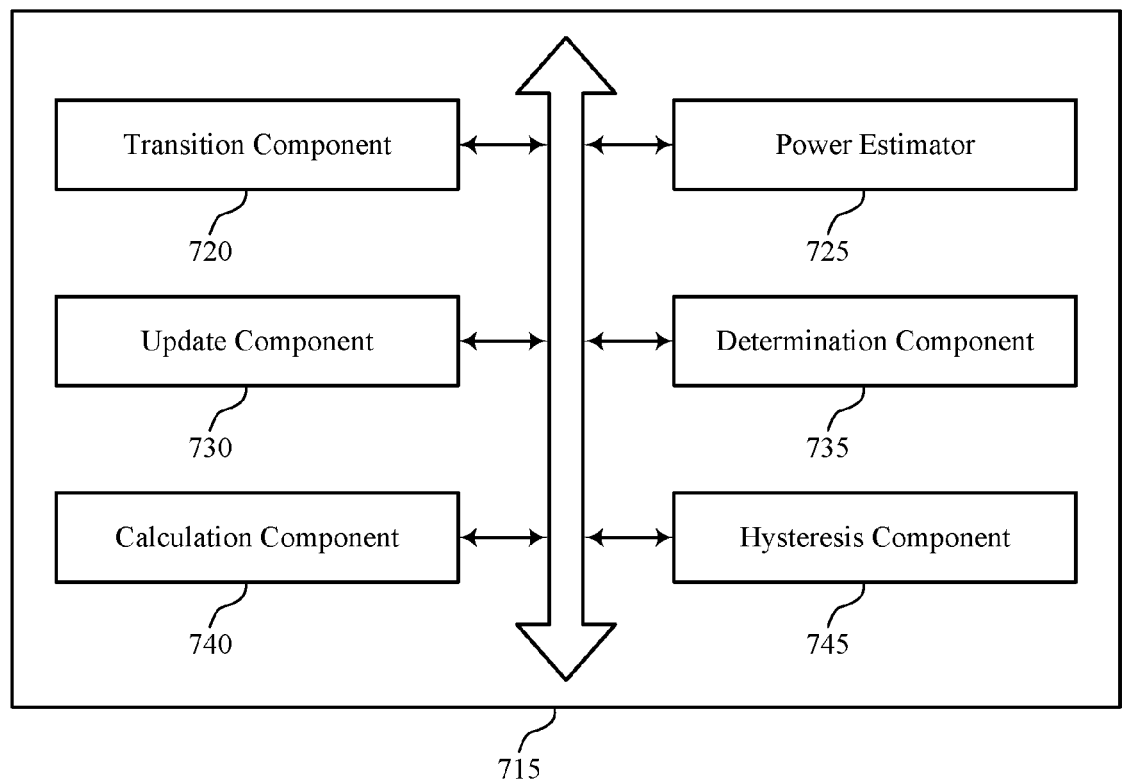

FIG. 7 shows a block diagram 700 of a wireless device 705 that supports dynamic timing update techniques for wireless devices in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dynamic timing update techniques for wireless devices, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include transition component 725, power estimator 730, and update component 735.

Transition component 725 may transition, by a UE, from a first coverage mode to a second coverage mode and transition from the second coverage mode to the first coverage mode within a time interval following transition from the first coverage mode to the second coverage mode. In some cases, the first coverage mode is CE Mode A and the second coverage mode is CE Mode B.

Power estimator 730 may estimate a first power consumption of the UE operating according to a first set of parameters that correspond to the first coverage mode, the first power consumption estimated based on a time remaining until a scheduled TAU procedure and estimate a second power consumption of the UE operating according to a second set of parameters that correspond to the second coverage mode, the second power consumption estimated based on the time remaining until the scheduled TAU procedure. In some cases, the first set of parameters includes a first eDRX cycle duration corresponding to the first coverage mode and an eDRX wakeup power. In some cases, the second set of parameters includes a second eDRX cycle duration corresponding to the second coverage mode, the eDRX wakeup power, and a TAU wakeup power. In some cases, the first eDRX cycle duration is different from the second eDRX cycle duration. In some cases, the scheduled TAU procedure is a periodic TAU procedure.

Update component 735 may perform a timing update procedure based on a comparison between the estimated first power consumption and the estimated second power consumption and initiate an unscheduled TAU procedure prior to the scheduled TAU procedure based on the determination. In some cases, update component 735 may refrain from performing an unscheduled TAU procedure based on the determination, and perform the scheduled TAU procedure based on a comparison between the time interval and a time of the hysteresis timer at the transition from the second coverage mode to the first coverage mode. In some examples, the unscheduled TAU procedure is initiated after the determination. In some aspects, performing the timing update procedure includes: modifying an eDRX cycle duration of the UE.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
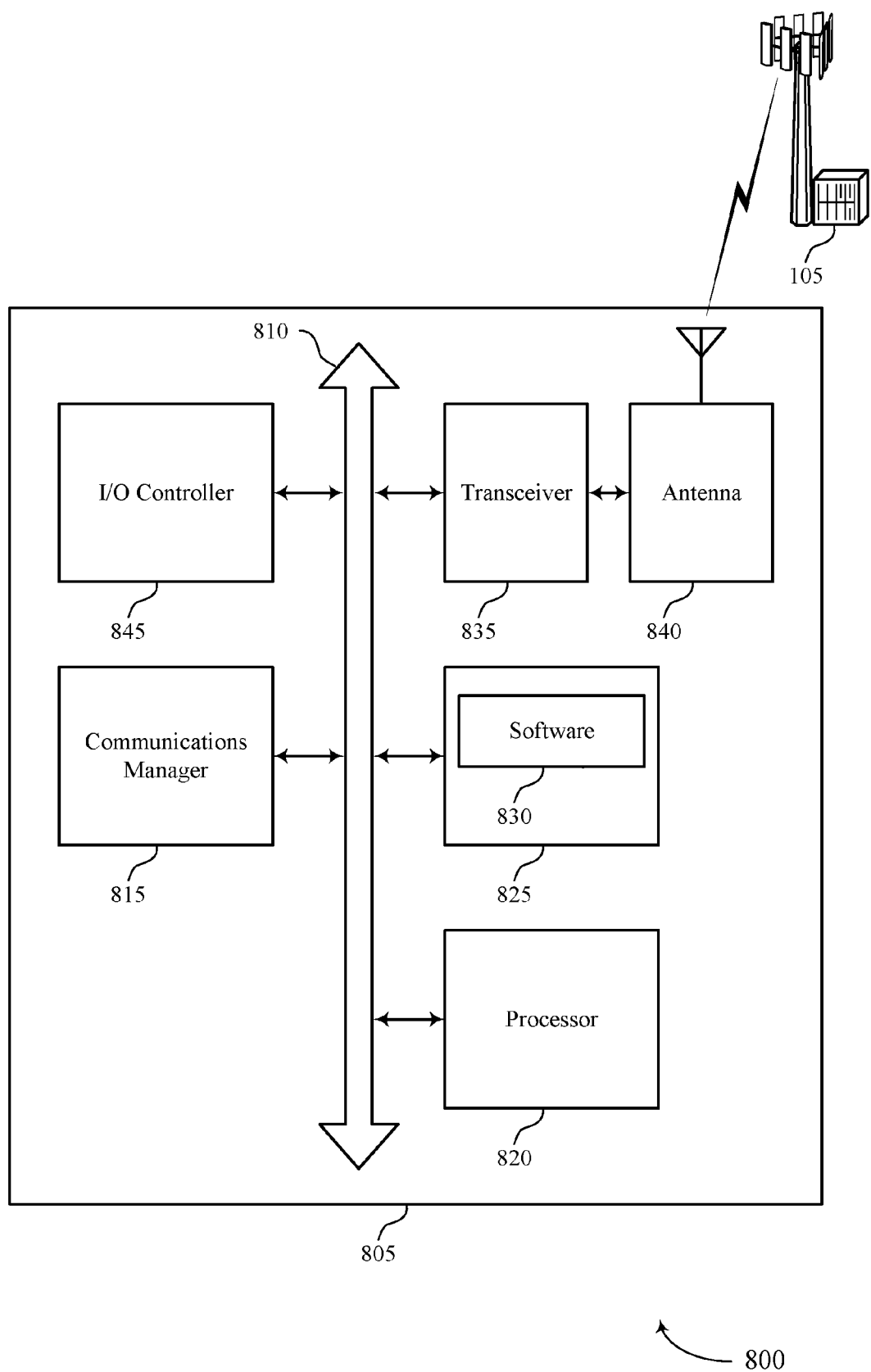
FIG. 8 illustrates a diagram of a system including a UE that supports dynamic timing update techniques for wireless devices in accordance with aspects of the present disclosure.

FIG. 8 shows a block diagram 800 of a communications manager 815 that supports dynamic timing update techniques for wireless devices in accordance with aspects of the present disclosure. The communications manager 815 may be an example of aspects of a communications manager 615, a communications manager 715, or a communications manager 915 described with reference to FIGS. 6, 7, and 9. The communications manager 815 may include transition component 820, power estimator 825, update component 830, determination component 835, calculation component 840, and hysteresis component 845. Each of these modules may communicate, directly or indirectly, with one another (e.g., via one or more buses).

Transition component 820 may transition, by a UE, from a first coverage mode to a second coverage mode and transition from the second coverage mode to the first coverage mode within a time interval following transition from the first coverage mode to the second coverage mode. In some cases, the first coverage mode is CE Mode A and the second coverage mode is CE Mode B.

Power estimator 825 may estimate a first power consumption of the UE operating according to a first set of parameters that correspond to the first coverage mode, the first power consumption estimated based on a time remaining until a scheduled TAU procedure and estimate a second power consumption of the UE operating according to a second set of parameters that correspond to the second coverage mode, the second power consumption estimated based on the time remaining until the scheduled TAU procedure. In some cases, the first set of parameters includes a first eDRX cycle duration corresponding to the first coverage mode and an eDRX wakeup power. In some cases, the second set of parameters includes a second eDRX cycle duration corresponding to the second coverage mode, the eDRX wakeup power, and a TAU wakeup power. In some examples, the first eDRX cycle duration is different from the second eDRX cycle duration. In some aspects, the scheduled TAU procedure is a periodic TAU procedure.

Update component 830 may perform a timing update procedure based on a comparison between the estimated first power consumption and the estimated second power consumption and initiate an unscheduled TAU procedure prior to the scheduled TAU procedure based on the determination. In some examples, update component 830 may refrain from performing an unscheduled TAU procedure based on the determination, and perform the scheduled TAU procedure based on a comparison between the time interval and a time of the hysteresis timer at the transition from the second coverage mode to the first coverage mode. In some cases, the unscheduled TAU procedure is initiated after the determination. In some cases, performing the timing update procedure includes: modifying an eDRX cycle duration of the UE.

Determination component 835 may determine that the estimated first power consumption is greater than the estimated second power consumption and determine that the estimated second power consumption is greater than the estimated first power consumption.

Calculation component 840 may calculate the time remaining until the scheduled TAU based on a time of transition from the first coverage mode to the second coverage mode.

Hysteresis component 845 may initiate a hysteresis timer after transitioning from the first coverage mode to the second coverage mode, where performing the timing update procedure is based on the hysteresis timer.

Figure 9:
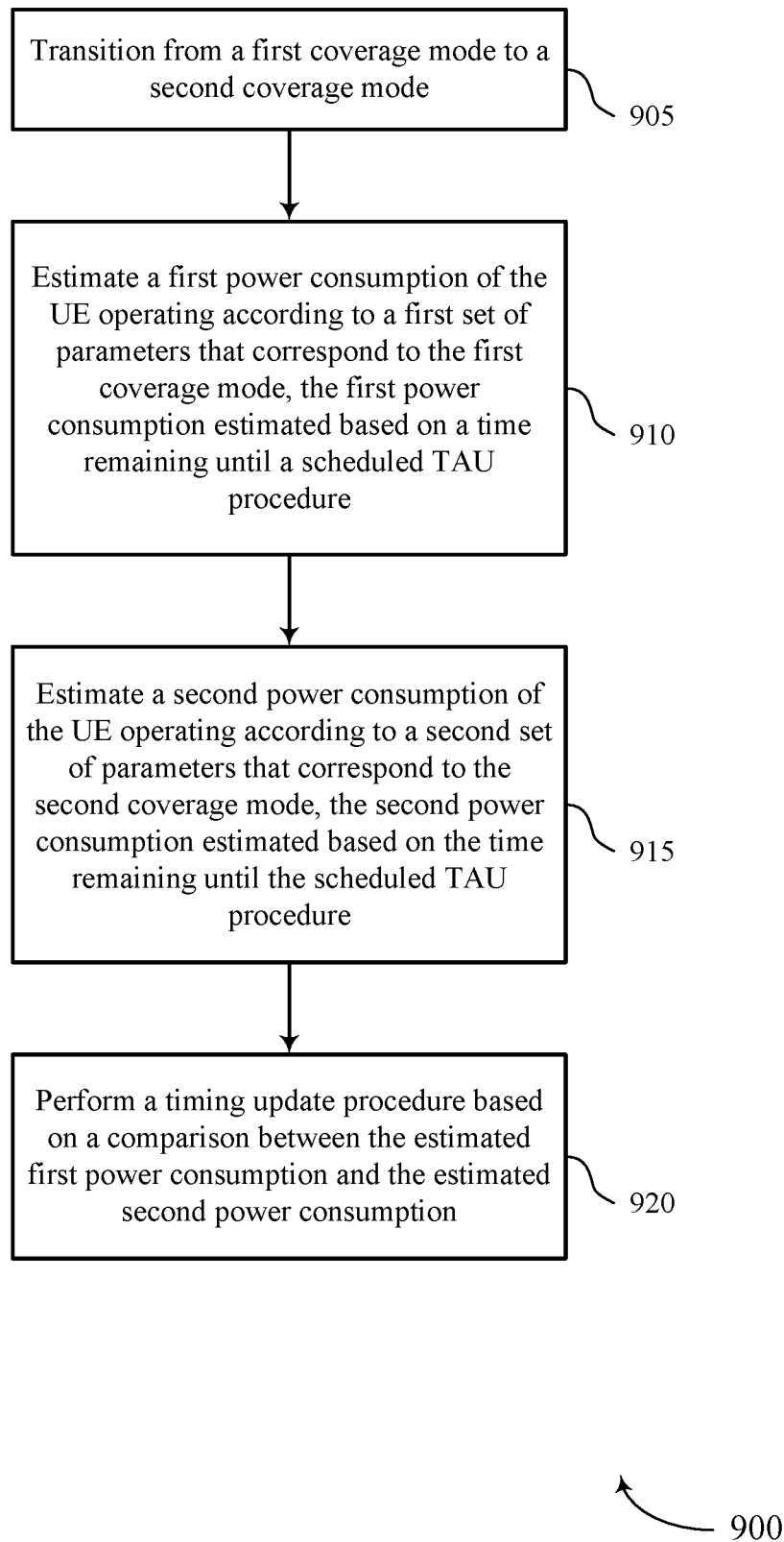
FIG. 9 illustrates a method for dynamic timing update techniques for wireless devices in accordance with aspects of the present disclosure.

FIG. 9 shows a diagram of a system 900 including a device 905 that supports dynamic timing update techniques for wireless devices in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting dynamic timing update techniques for wireless devices).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support dynamic timing update techniques for wireless devices. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

FIG. 10 shows a flowchart illustrating a method 1000 for dynamic timing update techniques for wireless devices in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may transition from a first coverage mode to a second coverage mode. The operations of block 1005 may be performed according to the methods described herein. In certain examples, aspects of the operations of block 1005 may be performed by a transition component as described with reference to FIGS. 6 through 9.

At block 1010 the UE 115 may estimate a first power consumption of the UE operating according to a first set of parameters that correspond to the first coverage mode, the first power consumption estimated based at least in part on a time remaining until a scheduled TAU procedure. The operations of block 1010 may be performed according to the methods described herein. In certain examples, aspects of the operations of block 1010 may be performed by a power estimator as described with reference to FIGS. 6 through 9.

At block 1015 the UE 115 may estimate a second power consumption of the UE operating according to a second set of parameters that correspond to the second coverage mode, the second power consumption estimated based at least in part on the time remaining until the scheduled TAU procedure. The operations of block 1015 may be performed according to the methods described herein. In certain examples, aspects of the operations of block 1015 may be performed by a power estimator as described with reference to FIGS. 6 through 9.

At block 1020 the UE 115 may perform a timing update procedure based at least in part on a comparison between the estimated first power consumption and the estimated second power consumption. The operations of block 1020 may be performed according to the methods described herein. In certain examples, aspects of the operations of block 1020 may be performed by a update component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transitioning, by a user equipment (UE), from a first coverage mode to a second coverage mode;
   estimating a first power consumption of the UE operating according to a first set of parameters that correspond to the first coverage mode, the first power consumption estimated based at least in part on a time remaining until a scheduled tracking area update (TAU) procedure;
   estimating a second power consumption of the UE operating according to a second set of parameters that correspond to the second coverage mode, the second power consumption estimated based at least in part on the time remaining until the scheduled TAU procedure; and
   performing a timing update procedure based at least in part on a comparison between the estimated first power consumption and the estimated second power consumption.

2. The method of claim 1, further comprising:
   determining that the estimated first power consumption is greater than the estimated second power consumption; and
   initiating an unscheduled TAU procedure prior to the scheduled TAU procedure based at least in part on the determination.

3. The method of claim 2, wherein:
   the unscheduled TAU procedure is initiated after the determination.

4. The method of claim 1, further comprising:
   determining that the estimated second power consumption is greater than the estimated first power consumption; and
   refraining from performing an unscheduled TAU procedure based at least in part on the determination.

5. The method of claim 1, wherein performing the timing update procedure comprises:
   modifying an extended discontinuous reception (eDRX) cycle duration of the UE.

6. The method of claim 1, wherein:
   the first set of parameters comprises a first extended discontinuous reception (eDRX) cycle duration corresponding to the first coverage mode and an eDRX wakeup power.

7. The method of claim 6, wherein:
   the second set of parameters comprises a second eDRX cycle duration corresponding to the second coverage mode, the eDRX wakeup power, and a TAU wakeup power.

8. The method of claim 7, wherein:
   the first eDRX cycle duration is different from the second eDRX cycle duration.

9. The method of claim 1, further comprising:
   calculating the time remaining until the scheduled TAU based at least in part on a time of transition from the first coverage mode to the second coverage mode.

10. The method of claim 1, further comprising:
    initiating a hysteresis timer after transitioning from the first coverage mode to the second coverage mode, wherein performing the timing update procedure is based at least in part on the hysteresis timer.

11. The method of claim 10, further comprising:
    transitioning from the second coverage mode to the first coverage mode within a time interval following transition from the first coverage mode to the second coverage mode; and
    performing the scheduled TAU procedure based at least in part on a comparison between the time interval and a time of the hysteresis timer at the transition from the second coverage mode to the first coverage mode.

12. The method of claim 1, wherein:
    the scheduled TAU procedure is a periodic TAU procedure.

13. The method of claim 1, wherein:
    the first coverage mode is coverage enhancement (CE) mode A and the second coverage mode is CE Mode B.

14. An apparatus for wireless communication, comprising:
    means for transitioning, by a user equipment (UE), from a first coverage mode to a second coverage mode;
    means for estimating a first power consumption of the UE operating according to a first set of parameters that correspond to the first coverage mode, the first power consumption estimated based at least in part on a time remaining until a scheduled tracking area update (TAU) procedure;
    means for estimating a second power consumption of the UE operating according to a second set of parameters that correspond to the second coverage mode, the second power consumption estimated based at least in part on the time remaining until the scheduled TAU procedure; and
    means for performing a timing update procedure based at least in part on a comparison between the estimated first power consumption and the estimated second power consumption.

15. The apparatus of claim 14, further comprising:
    means for determining that the estimated first power consumption is greater than the estimated second power consumption; and
    means for initiating an unscheduled TAU procedure prior to the scheduled TAU procedure based at least in part on the determination.

16. An apparatus for wireless communication, comprising:
    a processor;
    memory in electronic communication with the processor; and
    instructions stored in the memory and operable, when executed by the processor, to cause the apparatus to:
    transition, by a user equipment (UE), from a first coverage mode to a second coverage mode;
    estimate a first power consumption of the UE operating according to a first set of parameters that correspond to the first coverage mode, the first power consumption estimated based at least in part on a time remaining until a scheduled tracking area update (TAU) procedure;

estimate a second power consumption of the UE operating according to a second set of parameters that correspond to the second coverage mode, the second power consumption estimated based at least in part on the time remaining until the scheduled TAU procedure; and perform a timing update procedure based at least in part on a comparison between the estimated first power consumption and the estimated second power consumption.

17. The apparatus of claim 16, wherein the instructions are further executable by the processor to:

determine that the estimated first power consumption is greater than the estimated second power consumption; and initiate an unscheduled TAU procedure prior to the scheduled TAU procedure based at least in part on the determination.

18. The apparatus of claim 17, wherein:

the unscheduled TAU procedure is initiated after the determination.

19. The apparatus of claim 16, wherein the instructions are further executable by the processor to:

determine that the estimated second power consumption is greater than the estimated first power consumption; and refrain from performing an unscheduled TAU procedure based at least in part on the determination.

20. The apparatus of claim 16, wherein the instructions are further executable by the processor to:

modify an extended discontinuous reception (eDRX) cycle duration of the UE.

21. The apparatus of claim 16, wherein:

the first set of parameters comprises a first extended discontinuous reception (eDRX) cycle duration corresponding to the first coverage mode and an eDRX wakeup power.

22. The apparatus of claim 21, wherein:

the second set of parameters comprises a second eDRX cycle duration corresponding to the second coverage mode, the eDRX wakeup power, and a TAU wakeup power.

23. The apparatus of claim 22, wherein:

the first eDRX cycle duration is different from the second eDRX cycle duration.

24. The apparatus of claim 16, wherein the instructions are further executable by the processor to:

calculate the time remaining until the scheduled TAU based at least in part on a time of transition from the first coverage mode to the second coverage mode.

25. The apparatus of claim 16, wherein the instructions are further executable by the processor to:

initiate a hysteresis timer after transitioning from the first coverage mode to the second coverage mode, wherein performing the timing update procedure is based at least in part on the hysteresis timer.

26. The apparatus of claim 25, wherein the instructions are further executable by the processor to:

transition from the second coverage mode to the first coverage mode within a time interval following transition from the first coverage mode to the second coverage mode; and perform the scheduled TAU procedure based at least in part on a comparison between the time interval and a time of the hysteresis timer at the transition from the second coverage mode to the first coverage mode.

27. The apparatus of claim 16, wherein:

the scheduled TAU procedure is a periodic TAU procedure.

28. The apparatus of claim 16, wherein:

the first coverage mode is coverage enhancement (CE) mode A and the second coverage mode is CE Mode B.

29. A non-transitory computer readable medium storing code for wireless communication, the code comprising instructions executable by a processor to:

transition, by a user equipment (UE), from a first coverage mode to a second coverage mode;

estimate a first power consumption of the UE operating according to a first set of parameters that correspond to the first coverage mode, the first power consumption estimated based at least in part on a time remaining until a scheduled tracking area update (TAU) procedure;

estimate a second power consumption of the UE operating according to a second set of parameters that correspond to the second coverage mode, the second power consumption estimated based at least in part on the time remaining until the scheduled TAU procedure; and perform a timing update procedure based at least in part on a comparison between the estimated first power consumption and the estimated second power consumption.

30. The non-transitory computer-readable medium of claim 29, wherein the instructions are further executable by the processor to:

determine that the estimated first power consumption is greater than the estimated second power consumption; and initiate an unscheduled TAU procedure prior to the scheduled TAU procedure based at least in part on the determination.

* * * * *